United States Patent
Vana et al.

(10) Patent No.: US 10,773,797 B2
(45) Date of Patent: Sep. 15, 2020

(54) METHOD FOR USING AIRCRAFT WHEEL TYRE PRESSURE TO IMPROVE AIRCRAFT ENERGY EFFICIENCY AND DRIVE SYSTEM PERFORMANCE

(71) Applicant: Borealis Technical Limited, North Plains, OR (US)

(72) Inventors: Jan Vana, Prague (CZ); Isaiah W. Cox, London (GB); Joseph J. Cox, Portland, OR (US); Jonathan S. Edelson, Portland, OR (US); Nechama Cox, London (GB)

(73) Assignee: Borealis Technical Limited, Gibraltar (GI)

( * ) Notice: Subject to any disclaimer, the term of this patent is extended or adjusted under 35 U.S.C. 154(b) by 568 days.

(21) Appl. No.: 15/433,900

(22) Filed: Feb. 15, 2017

(65) Prior Publication Data

US 2017/0217572 A1    Aug. 3, 2017

Related U.S. Application Data

(63) Continuation-in-part of application No. 14/559,929, filed on Dec. 4, 2014, now abandoned.

(51) Int. Cl.
*B64C 25/36* (2006.01)
*B60C 23/04* (2006.01)
*B64C 25/40* (2006.01)

(52) U.S. Cl.
CPC .......... *B64C 25/36* (2013.01); *B60C 23/0408* (2013.01); *B64C 25/405* (2013.01)

(58) Field of Classification Search
CPC ....... B64C 25/405; B64C 25/36; B64C 25/34; B64D 45/00; B60C 23/001; B60C 23/0408
See application file for complete search history.

(56) References Cited

U.S. PATENT DOCUMENTS

| | | | |
|---|---|---|---|
| 3,273,382 A | * | 9/1966 | Fonash ................. B64C 25/001 177/136 |
| 6,657,334 B1 | | 12/2003 | Edelson |
| 6,838,791 B2 | | 1/2005 | Edelson |

(Continued)

FOREIGN PATENT DOCUMENTS

GB          2457144 A        8/2009
WO    WO-2014153182 A2 *  9/2014  ............. B64D 43/00

*Primary Examiner* — Philip J Bonzell

(57) ABSTRACT

A method is provided that enhances wheel drive assembly acceleration, heat reduction, and energy efficiency performance during ground travel in aircraft equipped with landing gear wheel-mounted drive assemblies to move aircraft on the ground without reliance on the aircraft's engines or external tow vehicles. Inflation pressure levels of tyres on the landing gear wheels are monitored with pressure and/or temperature sensors to determine and maintain an optimum defined high inflation pressure level for the specific kind of aircraft tyre or the aircraft. A clutch-activated drive assembly may be prevented from transferring torque and driving the aircraft when the optimum high inflation pressure levels are not present in the tyres during ground travel. Tyre pressures may be manually or automatically adjusted in response to processed sensor information to maintain the optimum high inflation pressure level in all tyres as the aircraft is driven with the drive assemblies or with engine thrust.

8 Claims, 3 Drawing Sheets

(56) References Cited

U.S. PATENT DOCUMENTS

| | | |
|---|---|---|
| 7,116,019 B2 | 10/2006 | Edelson |
| 7,445,178 B2 | 11/2008 | McCoskey et al. |
| 7,469,858 B2 | 12/2008 | Edelson |
| 7,891,609 B2 | 2/2011 | Cox |
| 7,975,960 B2 | 7/2011 | Cox |
| 8,109,463 B2 | 2/2012 | Cox |
| 9,022,316 B2 | 5/2015 | Gilleran et al. |
| 9,302,541 B2 | 4/2016 | Edelson |
| 10,308,352 B2 * | 6/2019 | Cookman ............. B64C 25/405 |
| 2005/0066718 A1 * | 3/2005 | Pradier ............... B60C 23/0433 |
| | | 73/146 |
| 2005/0150283 A1 * | 7/2005 | Shick .................... B60C 11/24 |
| | | 73/146 |
| 2005/0242937 A1 * | 11/2005 | Yokoi .................... B60C 19/00 |
| | | 340/447 |
| 2006/0144997 A1 * | 7/2006 | Schmidt ................ G01G 19/07 |
| | | 244/100 R |
| 2006/0273686 A1 | 12/2006 | Edelson et al. |
| 2007/0038408 A1 * | 2/2007 | Gaunt ................... B60C 23/001 |
| | | 702/138 |
| 2008/0033607 A1 * | 2/2008 | Zeliff .................. B64D 45/0005 |
| | | 701/31.4 |
| 2009/0091437 A1 * | 4/2009 | Corniot ............... B60C 23/0408 |
| | | 340/442 |
| 2009/0173821 A1 * | 7/2009 | Bhargava ............. B64C 25/405 |
| | | 244/50 |
| 2009/0184814 A1 * | 7/2009 | Lee ....................... B60C 23/001 |
| | | 340/447 |
| 2010/0256946 A1 * | 10/2010 | Carresjo ............. B60C 23/0462 |
| | | 702/138 |
| 2011/0148616 A1 * | 6/2011 | Cahill .................... B60C 23/042 |
| | | 340/442 |
| 2011/0184669 A1 * | 7/2011 | Liberge ............... B60C 23/0408 |
| | | 702/50 |
| 2011/0185802 A1 * | 8/2011 | Paul ...................... G01L 17/005 |
| | | 73/146.3 |
| 2011/0297786 A1 * | 12/2011 | Sweet .................... B64C 25/405 |
| | | 244/103 R |
| 2012/0217339 A1 * | 8/2012 | Gilleran ................ B64C 25/405 |
| | | 244/50 |
| 2013/0062466 A1 * | 3/2013 | Sweet .................... B64C 25/405 |
| | | 244/103 R |
| 2013/0274964 A1 * | 10/2013 | Jesse ....................... B64D 45/00 |
| | | 701/14 |
| 2014/0027571 A1 * | 1/2014 | Barmichev ......... B60C 11/1612 |
| | | 244/103 R |
| 2014/0067169 A1 * | 3/2014 | Hughes ................ G05D 1/0083 |
| | | 701/3 |
| 2015/0202931 A1 * | 7/2015 | Honig ................... B60C 23/001 |
| | | 152/416 |
| 2015/0231936 A1 * | 8/2015 | Keller ................. B60C 23/0406 |
| | | 340/442 |
| 2015/0284108 A1 * | 10/2015 | Keller ..................... B64C 25/36 |
| | | 340/960 |
| 2015/0298817 A1 * | 10/2015 | Jackson ................. B64D 45/00 |
| | | 701/3 |
| 2016/0025152 A1 | 1/2016 | Klassen et al. |
| 2016/0167803 A1 * | 6/2016 | Cookman ............ G05D 1/0083 |
| | | 701/29.1 |

* cited by examiner

METHOD FOR USING AIRCRAFT WHEEL TYRE PRESSURE TO IMPROVE AIRCRAFT ENERGY EFFICIENCY AND DRIVE SYSTEM PERFORMANCE

RELATED APPLICATION

This application is a continuation-in-part of U.S. patent application Ser. No. 14/559,929, filed 4 Dec. 2014.

TECHNICAL FIELD

The present invention relates generally to achieving improvements in energy efficiency and in performance of aircraft drive systems and specifically to improvements that can be achieved both in reduction of aircraft energy consumption and in aircraft landing gear wheel drive assembly performance based on a relationship between aircraft wheel tyre pressure and wheel drive system performance and tyre pressure and aircraft energy efficiency.

BACKGROUND OF THE INVENTION

It is widely recognized that maintaining correct inflation pressure in vehicle tyres results in increased fuel efficiency and increased safety. Fuel efficiency is enhanced when a properly filled tyre maintains a tyre manufacturer's recommended contact patch with a drive surface, thereby decreasing rolling resistance. Under- and over-inflated tyres are likely to fail as a result of stresses on tyre components, blowouts, or other causes and, consequently, can present a significant hazard risk for an operating vehicle. When the recommended pressure for a tyre is maintained, the likelihood of such risks should be minimized. Like some other vehicle tyres, aircraft tyres are designed to carry specified loads through a range of temperatures and wheel speeds. Unlike the tyres of vehicles that travel solely on ground surfaces, however, aircraft tyres must withstand external pressure at different altitudes and the forces associated with landing and takeoff, as well as travel conditions on ground surfaces. Aircraft tyres have long been required to be filled with nitrogen gas, which both reduces fire risks and extends tyre useful life. Even when aircraft tyres are filled with nitrogen, however, maintaining correct pressure in aircraft tyres is a key factor in ensuring that aircraft tyres and the landing gear wheel assemblies supporting them perform safely and reliably under the high static and dynamic loads encountered during landing, taxi, and takeoff. Taking steps to ensure that correct tyre pressure is maintained is of the utmost importance for safe aircraft ground movement, as well as for safe takeoff and landing operations.

It has been proposed to drive aircraft independently during taxi using motors and other drive means to move one or more drive wheels and move aircraft during ground movement. U.S. Pat. No. 7,445,178 to McCoskey et al, for example, describes electric nose wheel motors intended to drive aircraft during taxi. U.S. Pat. Nos. 7,469,858 to Edelson; ₇7,891,609 to Cox; U.S. Pat. No. 7,975,960 to Cox; U.S. Pat. No. 8,109,463 to Cox et al; and British Patent No. 2457144, owned in common with the present invention, describe electric drive motors and systems e to power aircraft wheels and move an aircraft on the ground without reliance on aircraft main engines or external tow vehicles. While the drive motors described in these patents can effectively move an aircraft autonomously without aircraft engines during ground operations, there is no suggestion of a relationship between efficient autonomous aircraft taxi and aircraft tyre pressure.

When aircraft are equipped with one or more landing gear wheels powered by landing gear wheel drive assemblies to move the aircraft on the ground autonomously without using the aircraft's main engines or external tow vehicles, operation of the components of a landing gear wheel drive assembly may have at least some effect on tyre pressure and that tyre inflation pressure may also have some effect on landing gear drive assembly operation. These relationships are not acknowledged or suggested by the prior art.

SUMMARY OF THE INVENTION

It is a primary object of the present invention to take advantage of a discovered relationship between aircraft tyre pressure and aircraft landing gear wheel drive assembly performance, as well as between aircraft tyre pressure and aircraft energy consumption when aircraft are driven during ground operations by a landing gear wheel drive assembly and to improve both drive system performance and aircraft energy efficiency in an aircraft equipped with one or more landing gear wheel drive assemblies to move the aircraft autonomously on the ground.

It is another object of the present invention to provide a method for improving energy efficiency and landing gear wheel drive assembly performance in an aircraft equipped with one or more landing gear wheel drive assemblies to move the aircraft autonomously on the ground by maintaining aircraft wheel tyre pressure at a level found to enhance landing gear wheel drive assembly performance and to produce significant fuel or other energy savings.

It is an additional object of the present invention to provide a method that maintains aircraft wheel tyre pressure at an inflation level which enhances landing gear wheel drive assembly acceleration and heat reduction in an aircraft equipped with one or more landing gear wheel drive assemblies to move the aircraft autonomously on the ground.

It is a further object of the present invention to provide a method for improving landing gear wheel drive assembly performance in an aircraft equipped with one or more landing gear wheel drive assemblies to move the aircraft autonomously on the ground that varies inflation pressure of the aircraft's tyres to simulate a weight change.

It is yet a further object of the present invention to provide a method for improving energy efficiency performance in an aircraft using the aircraft main engines to move the aircraft on the ground that is based on maintaining the tyre inflation pressure in all of the aircraft's tyres at a level found to minimize engine energy consumption.

In accordance with the aforesaid objects, a method is provided for improving both landing gear wheel drive assembly performance and energy efficiency performance in aircraft equipped with one or more landing gear wheel drive assemblies to move the aircraft autonomously on the ground and for reducing energy and/or fuel consumption in all aircraft. Achieving these objectives takes advantage of a discovered relationship between aircraft wheel tyre pressure and landing gear wheel drive assembly performance and a relationship between aircraft tyre pressure and aircraft energy efficiency in aircraft driven with landing gear wheel drive assemblies during ground operations. Maintenance of tyre pressure near an optimum high pressure additionally enhances landing gear wheel drive assembly acceleration and reduces drive system heating in aircraft equipped with one or more drive wheel drive systems.

Other objects and advantages will be apparent from the following description, claims, and drawings.

DESCRIPTION OF THE INVENTION

Figure 1:
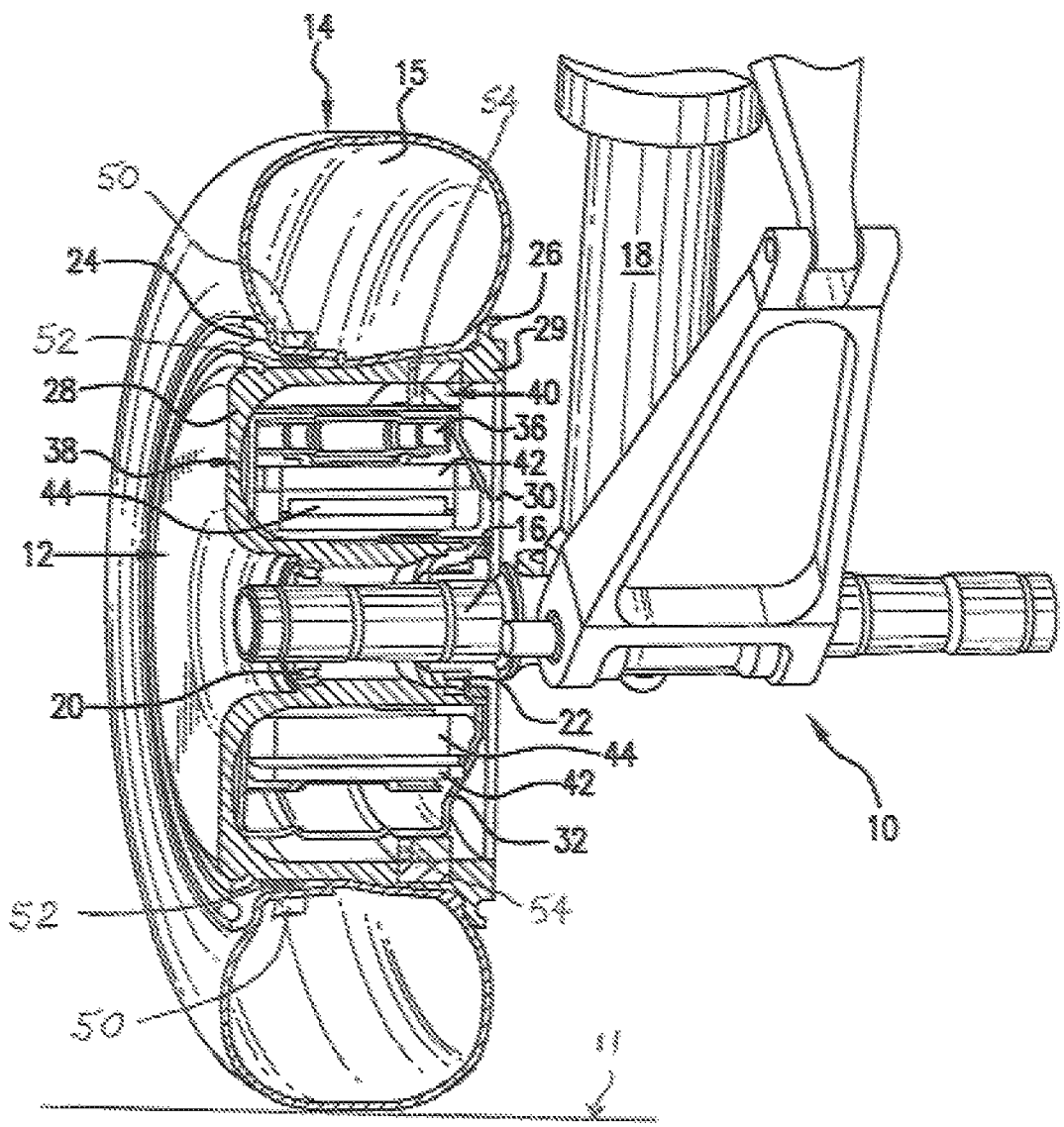
FIG. 1 is a view of a portion of an aircraft landing gear drive wheel with one configuration of a landing gear wheel drive assembly operable to drive the landing gear wheel and the aircraft equipped with the landing gear wheel drive assembly autonomously during ground travel without aircraft engines or external tow vehicles.

It is acknowledged in the airline industry that improperly inflated aircraft tyres can significantly compromise the safety of aircraft operations. As a result, the United States Federal Aviation Administration (FAA) and corresponding international aviation authorities continuously emphasize the importance of maintaining properly inflated aircraft tyres to prevent the occurrence of potentially catastrophic events. These authorities suggest that frequent tyre checks be conducted to ensure aircraft tyres remain inflated to within an inflation range, typically that specified in a maintenance manual for the aircraft. Since an aircraft tyre may lose up to five percent (5%) of tyre pressure a day under typical operations, frequent pressure checks are recommended to maintain correct tyre pressure and avoid premature tyre replacement. Ideally, tyre pressure should be checked at a time that enables maintenance of the recommended tyre pressure for each flight cycle.

Aircraft tyre manufacturers typically recommend a daily cold tyre inflation pressure check that also records the ambient or environmental temperature. The term "cold tyre" refers to a tyre that is about the same temperature as the surrounding, or ambient, air, usually after a post flight cooling period of about 2 to 3 hours. The terms "hot tyre" and "warm tyre" are used to refer to any tyre with a carcass temperature that exceeds the ambient temperature by about 30° C. (54° F.). While pressure and temperature can be measured for both cold and hot or warm tyres, pressure adjustments are generally made on cold tyres for optimum safety and reliability. A comparison of tyre pressures on adjacent tyres or pairs of tyres mounted on nose landing gear wheels and on main landing gear wheels is recommended to verify that the pressures of both tyres in the pair are substantially the same and at least equal to the specified operational loaded pressure. Maintaining optimum inflation pressures for all aircraft tyres, however, whether they are mounted on nose landing gear wheels or on main landing gear wheels, is recommended. Generally, at ambient temperatures, aircraft tyre pressures should not exceed the specified operational pressure by more than about 5%. The pressure of a hot tyre may exceed the specified operational pressure by much greater than 5%, however.

The minimum recommended service pressure for safe aircraft operation is typically the cold unloaded inflation pressure specified by the airframe manufacturer. The recommended safe aircraft tyre operating range may include a tolerance of −0% to +5% of the minimum service pressure. Monitoring and maintaining aircraft tyre pressure at the inflation levels described above is critical and clearly helps to prevent hazardous failures. Until the present invention, however, it had not been appreciated that monitoring and maintaining aircraft tyre pressure at specific inflation levels could have effects beyond improving safety. Nor was it directly acknowledged that aircraft tyre pressure could reduce energy consumption in all aircraft, including aircraft that rely on their main engines for ground travel and those that employ landing gear wheel drive assemblies to move aircraft without reliance on an aircraft's main engines during taxi. Further, the effect of aircraft tyre pressure on landing gear wheel drive assembly performance in an aircraft equipped with one or more landing gear wheel drive assemblies to move the aircraft autonomously during taxi has not been recognized.

The inventors of the present invention have discovered that aircraft equipped with one or more landing gear wheel drive assemblies operable to drive the aircraft autonomously on the ground without reliance on the aircraft's main engines or external tow vehicles, as well as aircraft not equipped with such landing gear wheel drive assemblies, demonstrate not only the operational safety referred to above, but also show improvements in landing gear wheel drive assembly operation, as well as energy efficiency performance when all of the aircraft's tyres are at an optimum high inflation pressure. In accordance with the present method, inflation pressures for aircraft tyres during ground operations may range from a low inflation pressure of about 190 pounds per square inch (psi) to a high inflation pressure of about 230 psi (13 bars to 16 bars). A medium tyre inflation pressure level is about 213 psi (15 bars). Drag force tests were conducted on an aircraft traveling at a high ground speed, defined as greater than about 5 meters/second. At this speed, drag force was determined to be constant. Aircraft tyres were inflated to each of the foregoing high, medium, and low tyre inflation pressures. The drag force was highest at the low tyre inflation pressure level and lowest at the high tyre inflation pressure level, with an increase in drag force of about 12% between driving the aircraft with tyres inflated at about 190 psi compared with driving the aircraft with tyres inflated at about 230 psi. Driving the aircraft with tyres inflated to about 213 psi, the medium inflation pressure level, showed an increase in drag force of about 4% over the drag force at the high inflation pressure level. The increase in drag force shown between driving the aircraft with tyres inflated at the medium inflation pressure level and driving the aircraft with tyres inflated at the low inflation pressure level was about 8%.

An unexpected reduction in rolling resistance may be realized when aircraft tyre inflation pressures are maintained at an optimum high inflation pressure. A concomitant reduction in rolling resistance is not seen when tyre pressures are at the low inflation pressure, however. An unexpectedly significant reduction in aircraft fuel consumption rate during autonomous landing gear wheel drive assembly-powered aircraft taxi and during engine-powered aircraft taxi may also be observed when wheel tyre pressure is at an optimum high inflation pressure for the specific kind of tyres mounted on the aircraft's wheels.

Referring to the drawing, FIG. 1 shows, in cross-sectional perspective view, a portion of an aircraft landing gear 10 and a landing gear wheel 12 with one configuration of a landing gear wheel drive assembly mounted within the landing gear wheel in an aircraft equipped with one or more landing gear wheels driven on the ground by the landing gear wheel drive assemblies to move the aircraft autonomously without engines or external tow vehicles. Although only one landing gear wheel is shown in detail, it is contemplated that one or more nose landing gear wheels, one or more main landing gear wheels, or a combination of nose and main landing gear wheels could be equipped with landing gear wheel drive assemblies as described herein. In one possible arrangement, for example, equipping both wheels in a two-wheel nose landing gear with the landing gear wheel drive assembly provides the capability not only to effectively move the aircraft on the ground, but also to differentially steer and brake the aircraft by selective activation of drive motors in each landing gear wheel drive assembly.

A tyre 14 is shown mounted on the wheel 12 and in contact with a ground surface 11. The wheel 12 and tyre 14 are rotatably mounted on an axle 16 attached to the landing gear 10. The landing gear 10 includes a central piston 18 and other standard landing gear structures (not identified) typically found in an aircraft nose or main landing gear. The wheel 12 is rotatably supported on the axle 16 by support structures, such as the bearing arrangements 20 and 22 shown adjacent to the axle 16. Other suitable support structures or bearings could also be used for this purpose. The wheel 12 preferably has the two-part configuration shown in FIG. 1, although other wheel designs could also be employed.

Removal and remounting of the tyre 12 is facilitated by providing a demountable tyre flange 24 on an outboard side of the wheel 12 that can be removed when necessary. The demountable flange could also be located on the inboard side of the wheel. A stationary tyre flange 26, shown here on the inboard side of the wheel, is provided to hold an opposite side of the tyre 14. The stationary tyre flange may be integrally formed with a portion 29 of a substantially "C"-shaped outboard wheel wall section 28 that forms most of the wheel. A smaller inboard wheel wall section 30 connects to the outboard wheel section 28 to define a maximum space or volume within the wheel 12 where components of an aircraft landing gear wheel drive assembly can be mounted. Other aircraft wheel configurations that support inflatable tyres are also contemplated to be within the scope of the present invention.

The tyre 14 includes a valve stem (not shown) that provides a fluid connection with the tyre interior 15 to allow inflation and/or deflation of the tyre.

Tyre pressure and/or temperature sensors, shown schematically at 50 and 52, may be included to facilitate the automatic monitoring of tyre temperature and/or pressure and may be positioned in locations other than those shown to effectively sense and monitor tyre inflation pressure and tyre temperature. A suitable processor (not shown 130 in FIG. 2A) is preferably provided with other electronic components on the aircraft to receive pressure and/or temperature data from the sensors 50, 52 and process and communicates the data to a pilot or flight crew in the aircraft cockpit so that appropriate action can be taken to adjust tyre pressure manually. A control system may also be included to respond automatically if required when the processed pressure or temperature data indicates an automatic response is required. Available sensors and processors may be adapted for this purpose, if necessary. Intelligent software may also be included to automatically determine whether tyre pressure is at a selected inflation level in response to sensed environmental, tyre, and/or landing gear wheel drive assembly conditions or operating parameters and to communicate this information to the cockpit or possibly ground control so that tyre pressure can be adjusted at an appropriate time. Apparatus (not shown) for automatically adding nitrogen gas to a tyre with a lower than optimum low inflation pressure level or releasing gas from a tyre with an inflation pressure that is higher than an optimum high inflation pressure level may also be provided. The optimum high and low inflation pressure levels will be those inflation pressure values recommended for the specific kind of tyres mounted on the aircraft's landing gear wheels equipped with landing gear wheel drive assemblies or on the aircraft's wheels that are not equipped with landing gear wheel drive assemblies. As noted, tyre manufacturers, and sometimes aircraft manufacturers, recommend optimum high and low tyre inflation pressure levels for particular tyres and for particular aircraft models. The optimum high and low tyre inflation pressures may be in the range of about 230 psi for high inflation pressures and about 190-210 psi for low inflation pressures.

A processor used in connection with sensing and monitoring tyre pressure as described above may log the inflation pressure of all aircraft tyres or only selected aircraft tyres at selected intervals during a period of time, a number of flight cycles, or any other length of time when an aircraft is operating on the ground. The monitored and logged tyre pressure information may be analyzed and used to optimize performance of the landing gear drive assembly in an aircraft equipped with one or more landing gear wheel drive assemblies as the aircraft is driven on the ground with the landing gear wheel drive assembly. Tyre inflation pressure levels may also be sensed and monitored and logged, and this information may be used in an aircraft that relies on its main engines for ground movement to effectively reduce fuel burn during taxi.

When, for example, both wheels in a nose landing gear are equipped with landing gear wheel drive assemblies to power aircraft movement during ground travel, pressure sensors 50 and software could be programmed to compare the pressure of each nose wheel tyre and to communicate this information to the processor. Any required adjustments can then be made automatically to ensure that the pressures of both tyres are substantially equal and are at optimum inflation pressure levels. The pressures and temperatures of other aircraft wheel tyres, including those on main landing gear wheels that are not driven by landing gear wheel drive assemblies, could additionally be automatically monitored and then adjusted as described. Tyre pressure may also be checked manually or using an available wireless system, and the necessary adjustments made manually right away. Whether tyre pressure is monitored automatically or manually, pressure sensors and/or monitors should be checked regularly and calibrated as required to ensure that pressure and other measurements are as accurate as possible.

The landing gear wheel drive assembly in an aircraft equipped with a landing gear wheel drive assembly may identify a tyre pressure deviation from an optimum inflation pressure by sensing and comparing the relative work and output of a drive motor in the landing gear wheel drive assembly. When more work is required by the drive motor for less output or benefit, a signal alerting the crew to that situation may be sent to the cockpit, and an indicator, for example, a yellow or other colored light or an audible tone, may be activated, indicating that a maintenance check is required. The landing gear drive assembly may measure tyre pressure directly, such as with the pressure sensors 50, or may infer tyre pressure from work, output, or the like, and send an alert to the cockpit or ground control when inflation pressure varies from an optimum or required pressure. Tyre pressure may then be corrected manually at an appropriate time.

One possible configuration and arrangement of components of an aircraft landing gear wheel drive assembly useful with the present method is shown in FIG. 1. Other functionally equivalent arrangements and configurations may also be useful with the present method. In the configuration shown, the components of the landing gear wheel drive assembly are enclosed within a housing 32 that is shaped to fit completely within the maximized space created by the arrangement of the respective outboard and inboard wall sections 28 and 30 of the landing gear wheel 12. The landing gear wheel drive assembly may include a drive motor 38 actuated by a drive system 36 positioned in activating contact with a clutch assembly 40, so that during operation of the landing gear wheel drive assembly, when the clutch assembly 40 is engaged, the clutch assembly activates the drive system 36, and the drive system 36 actuates the drive motor 38. Torque is transferred through these components when the landing gear wheel drive assembly is engaged and operated to drive the aircraft. These components may be preferably positioned as shown in FIG. 1, although other relative positions could also be employed.

A preferred drive motor 38 includes a rotating element, such as a rotor 42, and a stationary element, such as a stator 44. The rotor 42 is preferably located externally of the stator 44, as shown, but other drive motor component arrangements could also be used and are contemplated to be within the scope of the present invention. For example, the positions of the rotor 42 and stator 44 could be reversed so that the rotor is internal to the stator.

One type of drive motor 38 preferred for use with the aircraft landing gear wheel drive assembly described herein is an electric motor assembly that is capable of operating at high speed and could be any one of a number of suitable designs. An exemplary drive motor is an inside-out electric motor in which the rotor can be internal to or external to the stator, such as that shown and described in U.S. Patent Application Publication No. 2006/0273686, the disclosure of which is incorporated herein by reference. A range of motor designs capable of high torque operation across a desired speed range capable of moving an aircraft wheel and functioning as described herein may also be suitable non-engine drive motors in an aircraft landing gear wheel drive assembly. Drive motor 38 may preferably be a high phase order electric motor of the kind described in, for example, U.S. Pat. Nos. 6,657,334; 6,838,791; 7,116,019; and 7,469,858, the disclosures of the aforementioned patents being incorporated herein by reference. A suitable drive motor 38 may be a high phase order induction motor with a top tangential speed of about 15,000 linear feet per minute and a maximum rotor speed of about 7200 rpm, although drive motors capable of other speeds may also be used. Other drive motors, including hydraulic and/or pneumatic drive motors, are also contemplated to be within the scope of the present method. Power for an electric drive motor is preferably supplied by the aircraft auxiliary power unit (APU), but may be supplied by others source of electrical energy.

The drive system 36 may be an arrangement of gearing or a gear system. Alternatively, a roller traction drive or other functionally equivalent drive system may be used instead of gearing. A preferred drive system 36 for actuating a drive motor 38 capable of moving a commercial sized aircraft on the ground not only has a low profile and is light weight, but also provides the high torque and high speed change ratio required to optimally operate the drive motor and move the aircraft during ground operations.

A preferred clutch assembly 40 for the landing gear wheel drive assembly may be engaged automatically or manually to activate and deactivate the gearing, roller traction drive, or other drive system 36 into and out of actuation with the drive motor 38. The motor 38 is actuated by the drive system 36 to move the landing gear wheel 12 and drive the aircraft on the ground between landing and takeoff and during other ground travel and ground operations, for example into and out of maintenance facilities. In appropriate situations, the clutch assembly 40 may be disengaged to deactivate the drive system 36 to deactuate the drive motor 38 so that torque is not transferred through the landing gear wheel drive assembly, and the drive motor is unable to drive the aircraft wheel. The clutch assembly 40 is preferably positioned to move into and out of activating contact with the drive system 36. Preferably, the drive system 36 should only be activated by the clutch assembly 40 to actuate the drive motor 38 when the aircraft is actually on the ground, such as after landing and prior to takeoff and at other times, such as when the aircraft is traveling at a desired speed during ground travel.

One or more failsafe mechanisms 54, shown schematically with the clutch assembly 40, may be provided to prevent engagement of the clutch assembly 40 and activation of the drive system 36 and actuation of the drive motor 38 when the landing gear wheel drive assembly should not be operational, including when the aircraft landing gear wheels are not supporting the aircraft on the ground or the aircraft is in flight. In accordance with the present invention, the failsafe mechanism may be in communication with one or more of the tyre inflations pressure sensors 50, the processor, and with processor software that may be programmed to automatically disengage or prevent engagement of the clutch assembly 40 to prevent the landing gear wheel drive assembly from moving the aircraft wheel in the event that sensed tyre pressure is at an inflation level, whether too low or too high, where ground movement of the aircraft should not be started or should not be continued. Clutch failsafe mechanisms for controlling engagement of clutch assemblies in aircraft landing gear wheel drive assemblies are described in commonly owned U.S. Pat. No. 9,302,541 and in U.S. Patent Application Publication No. US2016/0025152. The disclosures of the foregoing patent and published patent application are fully incorporated herein by reference.

Figure 2A:
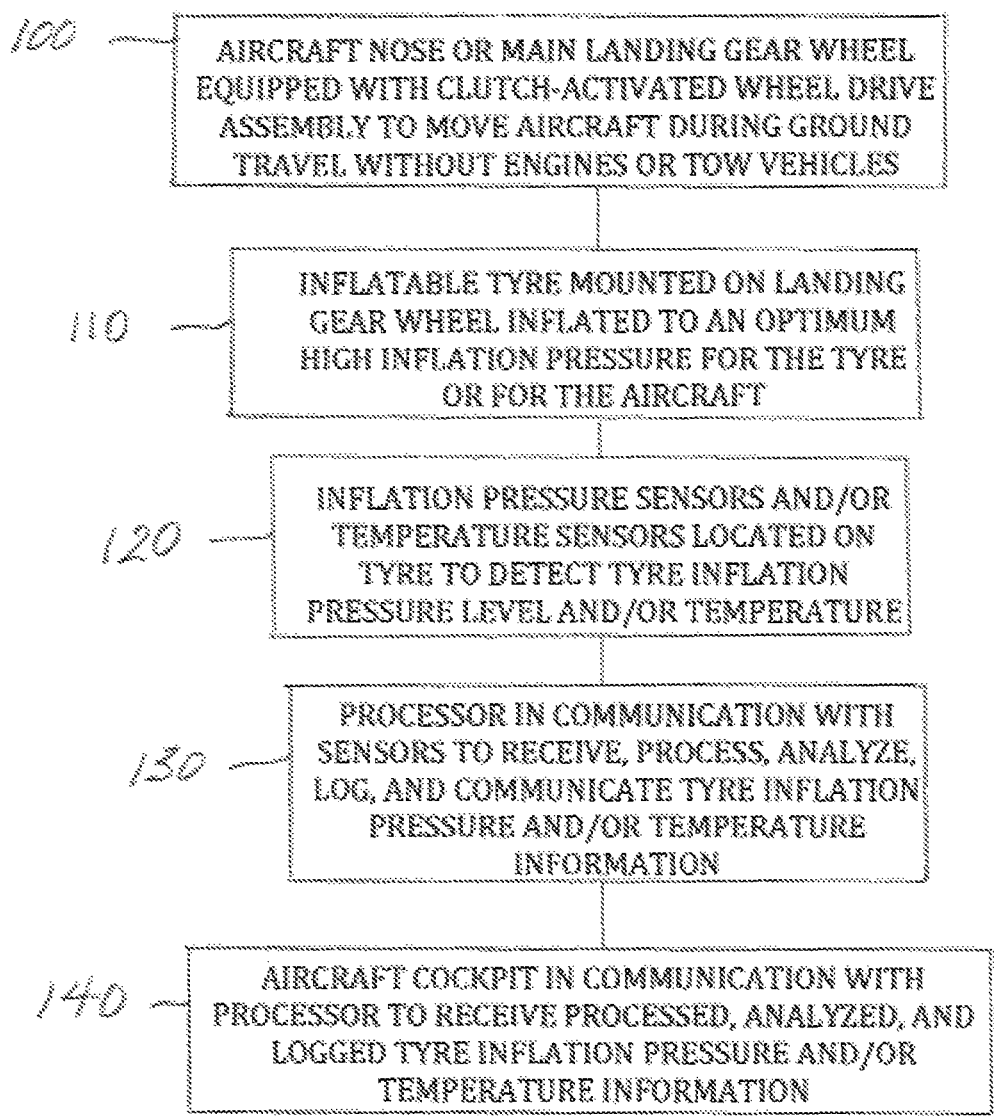
FIG. 2A is a chart that represents the aircraft landing gear wheel and aircraft components associated with the method of the present invention.

FIG. 2A represents the landing gear wheel and aircraft components associated with performing the method of the present invention. A landing gear wheel 100 is equipped with a clutch-activated wheel drive assembly as shown and described in connection with FIG. 1 to move the aircraft during ground travel without engines or tow vehicles. An inflatable tyre 110 is mounted on the landing gear wheel and inflated to an optimum high inflation pressure for the tyre or the aircraft. Pressure sensors and/or temperature sensors 120 are located on the tyre to detect tyre inflation pressure level and/or temperature. A processor 130 in communication with the sensors receives, processes, analyzes, logs, and communicates the tyre inflation pressure and/or temperature information. A cockpit 140 on the aircraft in communication with the processor 130 receives the processed, analyzed, and logged tyre inflation pressure and/or temperature information.

Figure 2B:
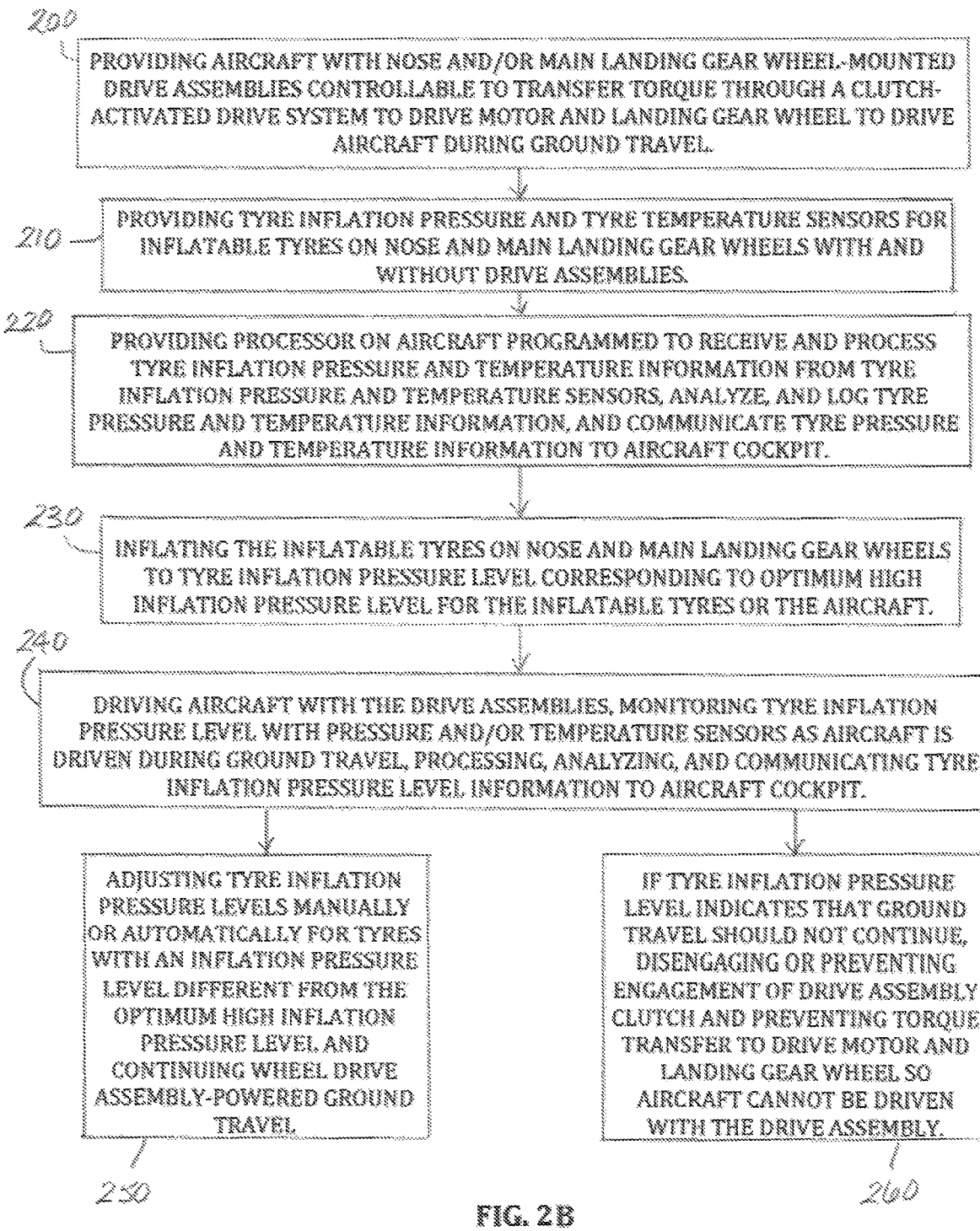
FIG. 2B is a flow chart describing the method that enhances wheel drive assembly acceleration, heat reduction, and energy efficiency performance during ground travel of aircraft equipped with landing gear wheel-mounted drive assemblies operable to drive the aircraft without reliance on aircraft main engines or external tow vehicles of the present invention.

FIG. 2B is a flow chart describing steps of the present method. An aircraft is provided with landing gear wheel-mounted drive assemblies controllable to transfer torque through a drive system to a drive motor and a landing gear wheel to drive the aircraft on the ground without engines or tow vehicles. (200) Tyre inflation pressure sensors and tyre temperature sensors are provided on nose and main landing gear wheels with and without drive assemblies. (210) A processor on the aircraft is programmed to receive and process tyre inflation pressure and temperature information from the tyre inflation pressure and temperature sensors, to process, analyze, and log the tyre inflation pressure and temperature information, and to communicate this information to the aircraft cockpit or to ground control. (220) The inflatable tyres on nose and main landing gear wheels are inflated to a tyre pressure level that corresponds to a recommended optimum high inflation pressure level for the inflatable tyres or for the aircraft. (230) The aircraft is driven with the landing gear wheel-mounted drive assemblies while the tyre inflation pressure level is monitored with the pressure and/or temperature sensors as the aircraft is driven during ground travel, and tyre inflation pressure level information is processed, analyzed, and communicated to the aircraft cockpit. (240) Tyre inflation pressures are adjusted manually or automatically for tyres determined to have an inflation pressure level different from the optimum high inflation pressure level and landing gear wheel drive assembly-powered ground travel is continued. (250) If the tyre inflation pressure level indicates that ground travel should not continue, the drive assembly clutch is disengaged or preventing from engagement to prevent torque transfer to the drive motor and landing gear wheel so that the aircraft cannot be driven with the landing gear wheel drive assembly. (260)

Maintaining the pressure of an aircraft tyre 14 at optimum aircraft tyre inflation pressure produces benefits not attributable to or equivalent to any that might be realized by increasing tyre inflation pressure to normal when a tyre has been underinflated. Improvements in automobile fuel efficiency have been observed when the pressure of underinflated tyres is increased to a recommended normal tyre pressure. The increase in aircraft energy efficiency actually produced by the present method of maintaining aircraft tyre pressure at an optimum high pressure far surpasses any expected fuel or other energy efficiency improvement based on fuel savings achieved in automobiles, however. The pressure of all of an aircraft's tyres should be monitored and maintained at the same optimum high pressure for the aircraft to realize this energy efficiency and the other benefits described herein.

In addition to the unexpected substantial energy savings possible when aircraft wheel tyre pressure on aircraft equipped with landing gear wheel drive assemblies as described herein is maintained at an optimum high pressure, the performance of the landing gear wheel drive assembly is also enhanced. Improvements in landing gear wheel drive assembly performance include enhanced landing gear wheel drive assembly acceleration and reduced landing gear wheel drive assembly heating. Other benefits associated with a landing gear wheel drive assembly that does less work for the same output or the same work for more output can additionally be realized with the present method.

A further aspect of the present method is the ability to simulate aircraft weight change by varying tyre pressure. Maintaining aircraft wheel tyre pressure at an optimum high inflation pressure clearly improves aircraft fuel efficiency performance and enhances landing gear wheel drive assembly performance. Reducing tyre pressure to an inflation level lower than the optimum high inflation pressure level can simulate a weight change and produce increased rolling resistance in situations when this would be desirable. The use of an automated system of pressure sensors and monitors allows tyre pressure reductions to be accomplished automatically when circumstances warrant this.

While the present invention has been described with respect to preferred embodiments, this is not intended to be limiting, and other arrangements, structures, and steps that perform the required functions are contemplated to be within the scope of the present invention.

INDUSTRIAL APPLICABILITY

The method for improving aircraft fuel efficiency performance of the present invention will find its primary applicability in aircraft equipped with one or more landing gear wheel drive assemblies operable to drive an aircraft autonomously during ground travel without reliance on the aircraft's main engines or external ground vehicles and may also be used in aircraft that rely on the main engines to power ground travel. Aircraft equipped with the landing gear wheel drive assemblies may realize additional improvements in landing gear wheel drive assembly performance when tyre pressure is maintained at optimum high pressure during ground operations.

The invention claimed is:

1. A method that controls ground travel of aircraft equipped with and driven by landing gear wheel-mounted drive assemblies controllable to drive the aircraft without reliance on aircraft main engines or external tow vehicles in response to landing gear wheel tyre inflation pressure, comprising:
   a. mounting landing gear wheel drive assemblies within a housing located completely within a space formed by inboard and outboard wheel sections of one or more nose landing gear wheels or one or more main landing gear wheels, wherein each landing gear wheel drive assembly comprises an engageable clutch assembly operable to transfer torque to a drive motor through a drive system and drive the one or more nose or one or more main landing gear wheels to move the aircraft when the clutch assembly is engaged, and the landing gear wheel drive assemblies are controllable to drive the aircraft during ground travel without reliance on aircraft main engines or external tow vehicles;
   b. providing inflatable tyres on each of the nose landing gear wheels and on each of the main landing gear wheels on the aircraft, and positioning tyre inflation pressure sensors and tyre temperature sensors in or on each of the nose and main landing gear wheel inflatable tyres to obtain and communicate pressure and temperature information from the tyre inflation pressure sensors and the tyre temperature sensors to a processor on the aircraft programmed to receive, process, analyze, and log the pressure and temperature information from the tyre inflation pressure sensors and the tyre temperature sensors and to communicate the processed, analyzed, and logged pressure and temperature data to a cockpit of the aircraft;
   c. inflating each of the nose and main landing gear wheel inflatable tyres to a high inflation pressure level recommended to be optimum for the inflatable tyres or for the aircraft, wherein the optimum high inflation pressure level produces a lower drag force and rolling resistance than the drag force and rolling resistance produced by an optimum low inflation pressure level for the inflatable tyres or the aircraft;

d. operating the engageable clutch assembly and engaging the clutch assembly to transfer torque to the drive motor through the drive system to drive the one or more nose landing gear wheels or the one or more main landing gear wheels, and driving the aircraft with each of the nose and main landing gear wheel inflatable tyres at the optimum high inflation pressure level;

e. monitoring the tyre inflation pressure level and temperature of each of the nose and main landing gear wheel inflatable tyres with the tyre inflation pressure sensors and the tyre temperature sensors, communicating the tyre pressure and tyre temperature information to the processor, processing, analyzing, and logging the tyre inflation pressure and tyre temperature information, and communicating the tyre inflation pressure level and temperature information to the aircraft cockpit; and f. continuing to drive the aircraft with the landing gear wheel drive assemblies during ground travel unless the communicated processed tyre inflation pressure level or tyre temperature information indicates that the inflatable tyres on the nose and main landing gear wheels do not have the optimum high tyre inflation pressure level and the aircraft should not be driven, and then disengaging the clutch assembly to stop torque transfer to the drive motor and to the one or more nose landing gear wheels or the one or more main landing gear wheels, and discontinuing ground travel.

2. The method of claim 1, further comprising identifying a deviation from the optimum high tyre inflation pressure level for the inflatable tyres on two of the one or more nose landing gear wheels, and communicating the deviation to a crew in the aircraft cockpit during aircraft ground travel.

3. The method of claim 1, wherein the optimum high inflation pressure level comprises about 230 psi, the optimum low inflation pressure level comprises about 190-210 psi, and drag force at the optimum high inflation pressure level is 12% lower than at the low optimum inflation pressure level.

4. The method of claim 1, further comprising programming the tyre inflation pressure sensors and the processor to compare the tyre inflation pressures of the inflatable tyres on two of the one or more nose landing gear wheels, communicating the inflation pressures to the processor and to the cockpit crew, and adjusting the tyre inflation pressures with apparatus for automatically adding nitrogen gas to a tyre with a lower than the optimum low inflation pressure level or releasing gas from a tyre with an inflation pressure level that is higher than the optimum high inflation pressure level so that the tyre inflation pressures of both nose landing gear wheel inflatable tyres are equal and are at the optimum high tyre inflation pressure level.

5. The method of claim 1, further comprising communicating the tyre inflation pressures of each of the inflatable tyres on the nose landing gear wheels and each of the inflatable tyres on the main landing gear wheels to the processor at selected intervals during a number of flight cycles or a during period of time when the aircraft is driven on the ground by the one or more nose or one or more main landing gear wheel-mounted drive assemblies, logging the tyre inflation pressures, and analyzing the logged tyre inflation pressures of each of the inflatable nose and main landing gear wheel inflatable tyres on the aircraft for the number of flight cycles or during the period of time.

6. The method of claim 5, further comprising communicating, logging, and analyzing only the tyre inflation pressures of the inflatable tyres on the nose landing gear wheels to the processor at the selected intervals for the number of flight cycles or during the period of time.

7. The method of claim 1, further comprising disengaging the clutch assembly, and stopping transfer of torque through the landing gear wheel-mounted drive assemblies so that the aircraft cannot be driven by the landing gear wheel-mounted drive assemblies when the tyre inflation pressures communicated to the processor exceed the optimum high inflation pressure level or are below the optimum low inflation pressure level on any one of the nose and main landing gear wheel inflatable tyres.

8. The method of claim 7, wherein the optimum high tyre inflation pressure level comprises an inflation pressure level of about 230 psi and the optimum low tyre inflation pressure level comprises an inflation pressure level of about 190 to 210 psi.

\* \* \* \* \*